(12) United States Patent
Hirabayashi et al.

(10) Patent No.: US 11,835,768 B2
(45) Date of Patent: Dec. 5, 2023

(54) FILLING RESIN AND OPTICAL WAVEGUIDE CIRCUIT FILLED WITH FILLING RESIN

(71) Applicant: Nippon Telegraph and Telephone Corporation, Tokyo (JP)

(72) Inventors: Katsuhiko Hirabayashi, Musashino (JP); Nobutatsu Koshobu, Musashino (JP); Ryoichi Kasahara, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 316 days.

(21) Appl. No.: 16/973,539

(22) PCT Filed: May 23, 2019

(86) PCT No.: PCT/JP2019/020463
§ 371 (c)(1),
(2) Date: Dec. 9, 2020

(87) PCT Pub. No.: WO2019/244553
PCT Pub. Date: Dec. 26, 2019

(65) Prior Publication Data
US 2021/0255395 A1 Aug. 19, 2021

(30) Foreign Application Priority Data
Jun. 18, 2018 (JP) ................................. 2018-115292

(51) Int. Cl.
*G02B 6/30* (2006.01)
*C08K 5/12* (2006.01)
*G02B 6/26* (2006.01)

(52) U.S. Cl.
CPC .................. *G02B 6/30* (2013.01); *C08K 5/12* (2013.01); *G02B 6/262* (2013.01)

(58) Field of Classification Search
CPC ......... G02B 6/30; G02B 6/262; G02B 6/4212
See application file for complete search history.

(56) References Cited

U.S. PATENT DOCUMENTS

| | | | |
|---|---|---|---|
| 6,304,687 B1 | 10/2001 | Inoue et al. | |
| 8,369,666 B2 * | 2/2013 | Kamei | G02B 6/29398 398/79 |
| 2009/0237800 A1 * | 9/2009 | Nakamura | G02B 5/26 359/613 |

FOREIGN PATENT DOCUMENTS

| | | |
|---|---|---|
| JP | 3436937 B2 | 6/2003 |
| JP | 2012-14151 A | 1/2012 |
| JP | 2017-170737 A | 9/2017 |

* cited by examiner

*Primary Examiner* — Michael P Mooney
(74) *Attorney, Agent, or Firm* — Workman Nydegger

(57) ABSTRACT

Provided is an optical waveguide circuit in which the space between waveguides, a waveguide groove, or the space between fibers is filled with a resin where a wavelength shifts to positive (shifts backward) instead of a conventional resin where a wavelength shifts to negative (shifts forward), to return a refractive index having decreased by an instantaneous change to the original refractive index. In the filling resin with which the space between the waveguides, the waveguide groove, the space between the fibers, or the space between the fiber and the waveguide is filled, upon input of light, a refractive index of a portion through which the light passes instantaneously decreases, and then the refractive index gradually increases to compensate the initial decrease in the refractive index.

11 Claims, 8 Drawing Sheets

(a)

(b)

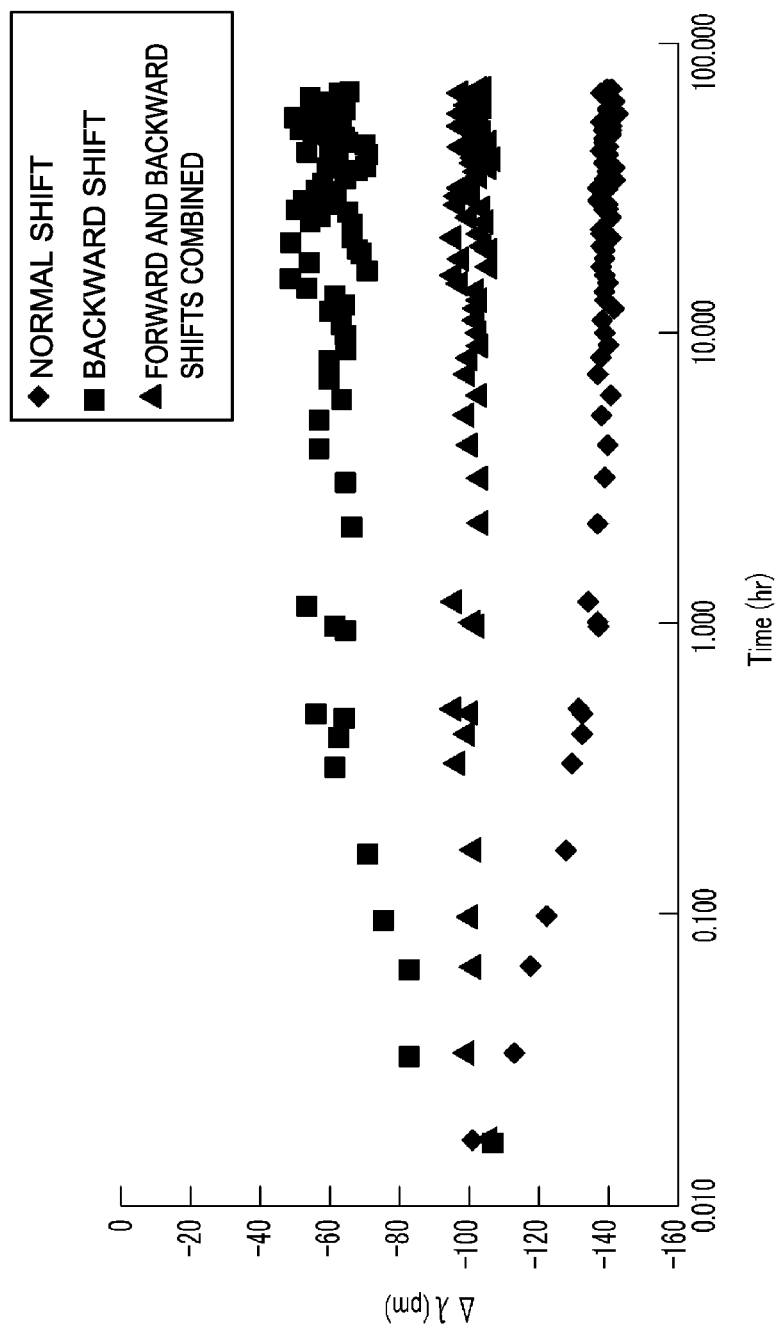

FILLING RESIN AND OPTICAL WAVEGUIDE CIRCUIT FILLED WITH FILLING RESIN

TECHNICAL FIELD

The present invention relates to the field of optical communication using optical fibers and waveguides, and the like, or to the field of visible measurement using optical fibers and waveguides, and particularly relates to a resin with which the space between waveguides, the space between fibers, or a waveguide groove is filled when a high power of 100 mW or more is transmitted to the fibers and the waveguides.

BACKGROUND ART

In the field of optical communication, a connector or a mechanical splicer is used to connect fibers. In the mechanical splicer, the space between fibers is filled with a silicone-based matching gel to improve the connection between the fibers. In the case of connection between a fiber and a waveguide, between waveguides, and between fibers, an adhesive is used, and in the case of filling of a groove dug in the waveguide with a wavelength plate or an athermal resin, an adhesive or a resin is used.

However, when input power becomes a high power of 10 mW to several W in the field of communication, the temperature of the resin rises due to absorption in the adhesive, the resin, and the matching gel. Due to a negative temperature dependence coefficient of the refractive index of the resin, the refractive index is lowered, and in the case of a filter including a Mach-Zehnder resonator, a ring resonator, an arrayed waveguide diffraction grating, or the like, the problem of shortening of the resonance wavelength or diffraction wavelength occurs. Further, a decrease in the refractive index of each of the resin and the adhesive, with which the space between the waveguide and the fiber and the space between the fibers are filled, leads to an increase in loss.

For example, FIG. 1 shows a measurement system. As shown in FIG. 1, when an athermal groove 107 of a temperature-independent Mach-Zehnder interferometer (MZI) interference filter circuit is filled with a resin 108 such as a silicone gel or rubber and light of several hundreds of mW is applied, with the silicone gel or rubber having an absorption of 1.8 dB/cm at a wavelength of 1540 nm, the temperature of a portion of the resin through which the light passes increases by about several ° C. to several tens of ° C., and the refractive index of the resin decreases. Here, a high-power light source 101 for 1550 nm and a 1550-nm amplified spontaneous emission (ASE) light source (white light source) 102 are connected to a two-by-two 3-dB coupler 104 through a fiber 103, the coupler 104 is connected to an optical waveguide circuit 106 mounted with a terminator 105 and a Mach-Zehnder interferometer (MZI) 109, and the optical waveguide circuit 106 is connected to a spectrum analyzer 110.

It is known that many resins, mainly silicone, are used as the resin 108 with which the athermal groove 107 is filled, and for example, the resins are described in Patent Literature 1.

Therefore, a transparent wavelength peak of the MZI interference filter shifts to the short-wave side. FIG. 2 shows the input power and the shift of the peak wavelength of the MZI. The wavelength decreases linearly with an increase in input power. At input of 200 mW, a wavelength shift by −70 pm was observed.

FIGS. 3(a) and 3(b) show the results of further measuring changes over time thereafter. FIG. 3(a) shows a characteristic of a typical dimethyl silicone gel. When input power is applied, the wavelength shifts to a shorter wave by −72 pm within ten seconds and then becomes constant. This change in refractive index within ten seconds is referred to as an "instantaneous change." Hard materials of dimethyl silicone and methyl phenyl silicone exhibit such a characteristic and do not make a change over time. However, in some silicone gels, after reaching −75 pm within ten seconds, the wavelength gradually shifts to a shorter wave with time for a few hundreds of hours and is eventually saturated to reach −140 pm. This change is referred to as a "change over time." FIG. 3(b) shows a characteristic of a resin obtained by mixing a dimethyl silicone gel and a dimethyl phenyl silicone gel. The wavelength reached −75 pm within ten seconds and then shifts gradually to a shorter wave to become −140 pm after 100 hours. This phenomenon in which the wavelength gradually shifts to a shorter wave is referred to as a forward shift.

In the resin with which the space between the optical fibers and the space between the waveguides are filled as described above, when a power of 100 mW is input, with a core area being an exceedingly small area of $10^{-6}$ cm$^2$, the density becomes an exceedingly high power density of $10^2$ kW/cm$^2$, and hence the temperature of a portion of the resin through which light passes rises from several ° C. to several tens of ° C. dn/dT, which is the temperature dependence coefficient of the refractive index of the resin, is $-3.7 \times 10^{-4}$/° C., so that the temperature instantaneously rises and the wavelength shifts to a shorter wave. Further, molecules having a high refractive index (plasticizers and uncured molecules) diffuse to the periphery, or molecules having a low refractive index diffuse flow in from the periphery, whereby the refractive index further decreases, and the wavelength shifts to a shorter wave with time. When the resin is soft (gel-like), the resin tends to diffuse.

CITATION LIST

Patent Literature

Patent Literature 1: Japanese Patent No. 3436937

SUMMARY OF THE INVENTION

Technical Problem

The space between the waveguides and the space between the fibers have been filled with various resins represented by silicone. Some of these materials have a characteristic in which the refractive index instantaneously decreases upon application of high power and also decreases thereafter.

In order to improve the drawback of a linear decrease in wavelength with an increase in input power, the inventors have invented the use of fluorine-containing silicone having little absorption as a resin with which an athermal groove is filled.

There has been a problem where, when high power is input to the optical waveguide circuit, the temperature of the light passing portion of the resin in the groove increases and the refractive index decreases instantaneously, resulting in an increase in loss, and a great shift of the wavelength to a shorter wave in the case of the filter.

Means for Solving the Problem

The present invention has been made to solve the problem as thus described, and an object of the present invention is to provide an optical waveguide circuit in which, instead of or in addition to a conventional resin where a wavelength shifts to negative (shifts forward), the space between waveguides, a waveguide groove, or the space between fibers is filled with a resin where a waveguide shifts to positive (shifts backward), or a resin where a wavelength shifts to forward and backward, and a refractive index having decreased by an instantaneous change returns to the original refractive index due to the resin.

For achieving such an object, a first aspect of the filling resin of the present invention is a filling resin with which a space between the waveguides, a waveguide groove, a space between the fibers, or a space between the fiber and the waveguide is filled, wherein upon input of light, a refractive index of a portion through which the light passes instantaneously decreases, and then the refractive index gradually increases to compensate the initial decrease in the refractive index.

According to a second aspect of the filling resin of the present invention, in the first aspect, the filling resin is dimethyl silicone, phenylmethyl silicone, phenyl silicone, fluorine (F)-containing silicone, or a resin obtained by mixing two or more different sorts of silicones having a refractive index difference of 0.04 or less.

According to a third aspect of the filling resin of the present invention, in the first aspect, the filling resin is a resin obtained by mixing a plasticizer selected from a first group including a phthalic ester plasticizer, an adipic ester plasticizer, and a polyester plasticizer, with a resin selected from a second group including dimethyl silicone, phenylmethyl silicone, phenyl silicone, fluorine (F)-containing silicone, a resin obtained by mixing two or more different sorts of silicones having a refractive index difference of 0.04 or less, polyethylene, ethylene-vinyl acetate copolymer, ethylene acrylate copolymer, polyisobutylene, ethylene-propylene rubber, chlorosulfonated polyethylene rubber, chlorinated polyethylene rubber, polypropylene, polybutadiene rubber, styrene-butadiene block rubber, and styrene polyolefin rubber.

In a filling resin with which the waveguide groove is filled, one optical waveguide has two or more places to fill, a resin with which some of the places to fill are filled is the filling resin according to the second aspect or the third aspect, and a resin with which the rest of the places to fill is filled is a resin having a refractive index that gradually decreases after light is input.

In an optical waveguide circuit having the waveguides, the waveguide groove, or the fibers, the filling resin according to any one of the first to third aspects is provided between the waveguides, in the waveguide groove, or between the fibers.

Effects of the Invention

It has been found that a material obtained by mixing different silicones having a refractive index difference of 0.04 or less or a material to which a plasticizer has been added has such a characteristic that a refractive index instantaneously decreases upon input of high power and then increases gradually to compensate the initial decrease in the refractive index. A mixture obtained by adding the plasticizer to rubber also exhibits a similar characteristic. By filling the space between waveguides, a waveguide groove, or the space between fibers with these resins, an optical waveguide circuit having a constant refractive index and a constant wavelength can be prepared.

BRIEF DESCRIPTION OF DRAWINGS

FIG. 8 is a diagram showing a change over time in the wavelength of the filter when both the backward shifting resin and the forward shifting resin are used.

DESCRIPTION OF EMBODIMENTS

Figure 1:
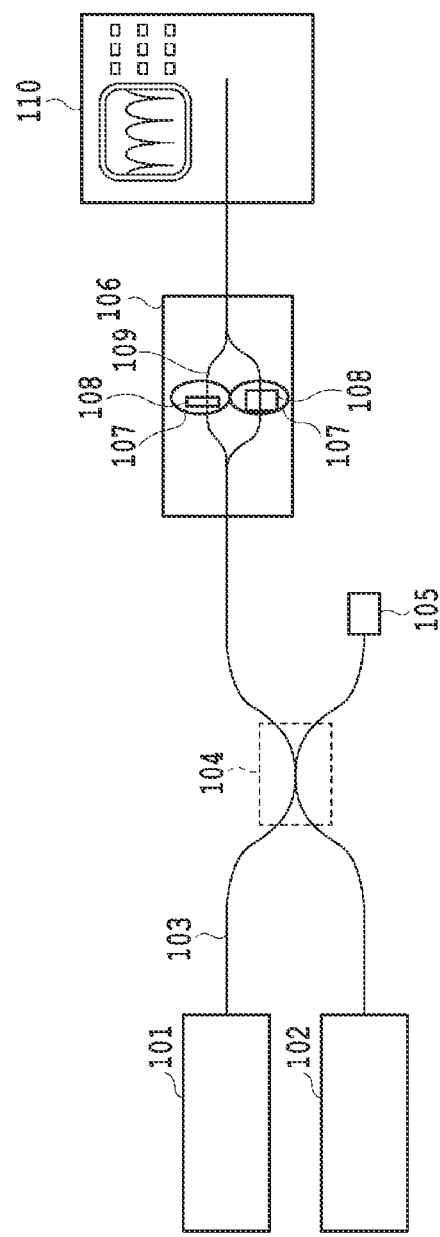
FIG. 1 is a diagram showing an example of a measurement system that measures a change in refractive index of a resin when light is input.
Figure 2:
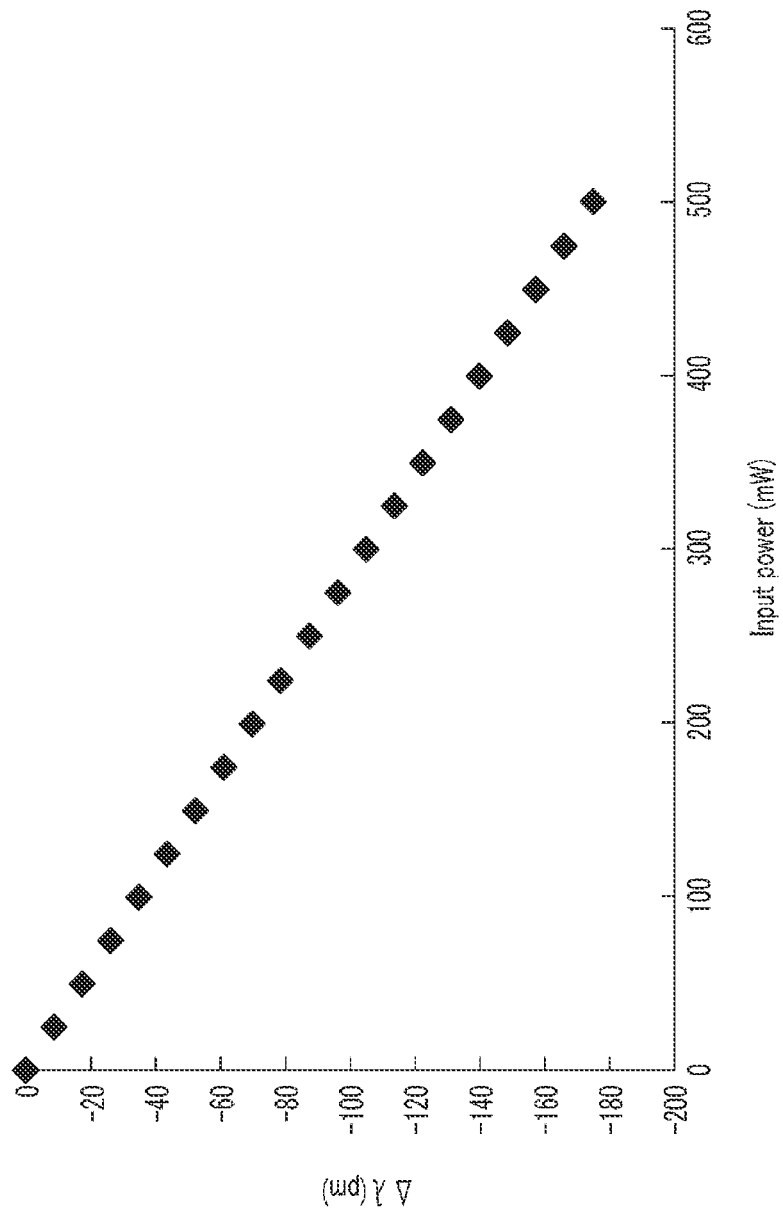
FIG. 2 is a diagram showing a relationship between an instantaneously changed wavelength and input power in the measurement system of FIG. 1.
Figure 3:
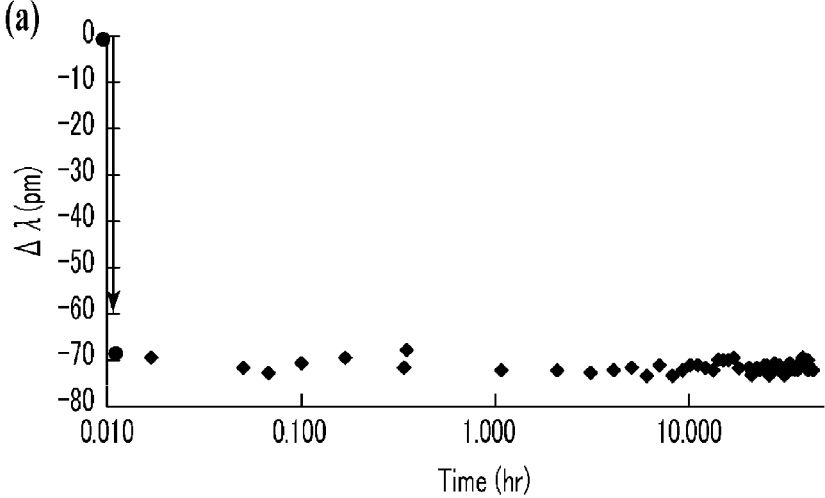
FIG. 3(a) is a diagram showing a change over time in wavelength when 200 mW of light is input in the case of filling with a typical dimethyl silicone.
FIG. 3(b) is a diagram showing a change over time in wavelength when 200 mW of light is input in the case of filling with a resin obtained by mixing dimethyl silicone and dimethyl phenyl silicone having different refractive indices.
Figure 3:
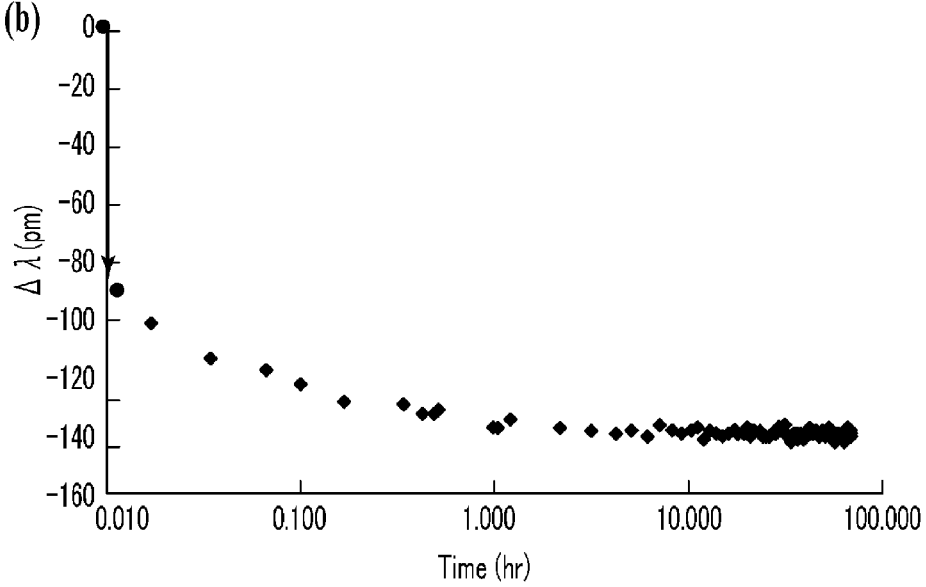

Hereinafter, embodiments of a filling resin and an optical waveguide circuit of the present invention will be described in detail with reference to the drawings. However, the present invention is not limited to the description of the following examples, and it will be apparent to those skilled in the art that various changes in form and details may be made without departing from the gist of the invention disclosed herein. Further, configurations according to embodiments and examples can be implemented in combination as appropriate. In the configuration of the invention described below, the same reference numerals are used for the same portions or portions having similar functions.

FIG. 1 shows a measurement system. In this measurement system, a high-power light source 101 for 1550 nm and a 1550 nm ASE light source (white light source) 102 are connected to a two-by-two 3-dB coupler 104 through a fiber 103. Further, in the measurement system, the coupler 104 is connected to an optical waveguide circuit 106 mounted with a terminator 105 and the Mach-Zehnder interferometer (MZI) 109. Moreover, in the measurement system, the optical waveguide circuit 106 is connected to a spectrum analyzer 110. An athermal groove 107 for making the MZI interferometer temperature-independent is filled with a resin 108 (mainly silicone). A change in refractive index of a material can be measured with a spectrum analyzer 110 by inputting high-power light and white light (ASE) for observing the wavelength of the interferometer from the ASE light source (white light source) 102 with the 3-dB coupler and monitoring a change in wavelength upon input of high power from the high-power light source 101. After the measurement of the change in the refractive index of the resin in this circuit, the groove 107 was filled with the resin 108 capable of compensating an instantaneous change with a subsequent change over time.

An increase and a decrease in refractive index when light is locally introduced into the resin 108 can be easily measured by using a temperature-independent Mach-Zehnder interferometer 109. An increase and a decrease in the refractive index of the resin with which an athermal arrayed waveguide grating (AWG) is filled can be easily measured by cutting out an MZI portion of a waveguide filled with the resin, attaching a fiber, and assembling the interferometer to measure a transparent wavelength.

As a result of examining many silicone resins, in 70% of single silicones having normal refractive indices of 1.4 to 1.55, the wavelength shifts to negative in the change over time, and in 30% of the single silicones, the wavelength remained constant without shifting.

However, among the silicones, in some of fluorosilicone and fluorine gels containing fluorine F with a refractive index of 1.4 or less, even though being simple substances, the wavelength shifts to positive in the change over time. Further, in some of silicones with a refractive index of 1.55 or more containing many phenyl groups of phenyl silicone, the wavelength shifts to positive in the change over time. This phenomenon of the gradual shift to positive is referred to as a backward shift.

When two silicones were selected from the large number of silicones and mixed, in the change over time, the refractive index shifted to negative in 75% of the mixtures, and the refractive index shifted to positive in 25% of the mixtures.

As for materials except for the silicone, when plasticizers in Table 1 were added to polyethylene, ethylene-vinyl acetate copolymer, ethylene acrylate copolymer, polyisobutylene, ethylene-propylene rubber, chlorosulfonated polyethylene rubber, chlorinated polyethylene rubber, polypropylene, polybutadiene rubber, styrene-butadiene block rubber, or styrene polyolefin rubber, one that performs the backward shift (makes a change over time on the positive side) or one that performs the forward shift (makes a change over time on the negative side) were obtained. Table 1 shows refractive indices of plasticizers used in the present embodiment.

TABLE 1

| Classification | Product name | Refractive index (25° C.) |
|---|---|---|
| Phthalic ester | DOP bis (2-ethylhexyl) phthalate | 1.485 |
| | DOP-MS bis (2-ethylhexyl) phthalate | |
| | DINP diisononyl phthalate | 1.484 |
| | DIDP diisononyl phthalate | 1.484 |
| | DUP diundecyl phthalate | 1.481 |
| Adipic ester | DOA bis (2-ethylhexyl) adipate | 1.446 |
| | DINA diisononyl adipate | 1.449 |
| | D610A di-n-alkyl adipate | 1.443 |
| | DIDA diisononyl adipate | 1.451 |
| | D931 bis (2-butoxyethyl) adipate | 1.441 |
| Adipic polyester | D620 adipic acid polyester | 1.457 |
| | D621 adipic acid polyester | 1.462 |
| | D623 adipic acid polyester | 1.465 |
| | D643 adipic acid polyester | 1.466 |
| | D645 adipic acid polyester | 1.467 |
| | D633 adipic acid polyester | 1.465 |

TABLE 1-continued

| Classification | Product name | Refractive index (25° C.) |
|---|---|---|
| | D620N adipic acid polyester | 1.458 |
| | D623N adipic acid polyester | 1.464 |
| | D643D adipic acid polyester | 1.467 |
| | D640A adipic acid polyester | 1.463 |
| Phthalate ester | D671N phthalate polyester | 1.507 |

In the present embodiment, it has been found that by filling the space between the waveguides, the waveguide groove, the space between the fibers, or the space between the fiber and the waveguide with filling resins (b) and (c) to be described later, in the optical waveguide circuit of the present embodiment, upon input of light, a refractive index of a portion through which the light passes instantaneously decreases, and then the refractive index gradually increases to compensate the initial decrease in the refractive index. The filling resin having this characteristic is referred to as a filling resin (a).

The filling resin (b) of the present embodiment is a methyl silicone gel, a phenylmethyl silicone gel, a phenyl silicone gel, a silicone gel containing fluorine (F), or a resin obtained by mixing two or more different sorts of the silicone gels having a refractive index difference of 0.04 or less. The two or more different sorts of silicone gels can be mixed because the refractive index difference therebetween is within 0.04. Note that methyl silicone, phenylmethyl silicone, phenyl silicone, fluorine (F)-containing silicone, and two or more different sorts of silicones having a refractive index difference of 0.04 or less, used for the filling resin (b), may be rubber instead of gel.

The filling resin (c) of the present embodiment is a resin obtained by mixing a plasticizer selected from a first group including a phthalic ester plasticizer, an adipic ester plasticizer, and a polyester plasticizer, with a resin selected from a second group including a dimethyl silicone gel, a phenylmethyl silicone gel, a phenyl silicone gel, a fluorine (F)-containing silicone gel, a resin obtained by mixing two or more different sorts of silicone gels having a refractive index difference of 0.04 or less, polyethylene, ethylene-vinyl acetate copolymer, ethylene acrylate copolymer, polyisobutylene, ethylene-propylene rubber, chlorosulfonated polyethylene rubber, chlorinated polyethylene rubber, polypropylene, polybutadiene rubber, styrene-butadiene block rubber, and styrene polyolefin rubber. Note that methyl silicone, phenylmethyl silicone, phenyl silicone, fluorine (F)-containing silicone, two or more different sorts of silicones having a refractive index difference of 0.04 or less, used for the filling resin (c), may be rubber instead of gel.

In the resin with which the waveguide groove is filled, there is one place to fill in one optical waveguide of the optical waveguide circuit, but two or more places to fill may be provided, and the filling resins (a) to (c) may be applied to the resin with which some of the two or more places are filled, and a resin with which the rest of the places to fill is filled may be a resin having a refractive index that gradually decreases after light is input.

Example 1

In the present example, an example will be shown where the following filling resin is applied into the waveguide groove of the optical waveguide circuit. Dimethyl silicone gels KE1056 (refractive index $n_D(25°\,C.)=1.414$), KLE1055

Figure 4:
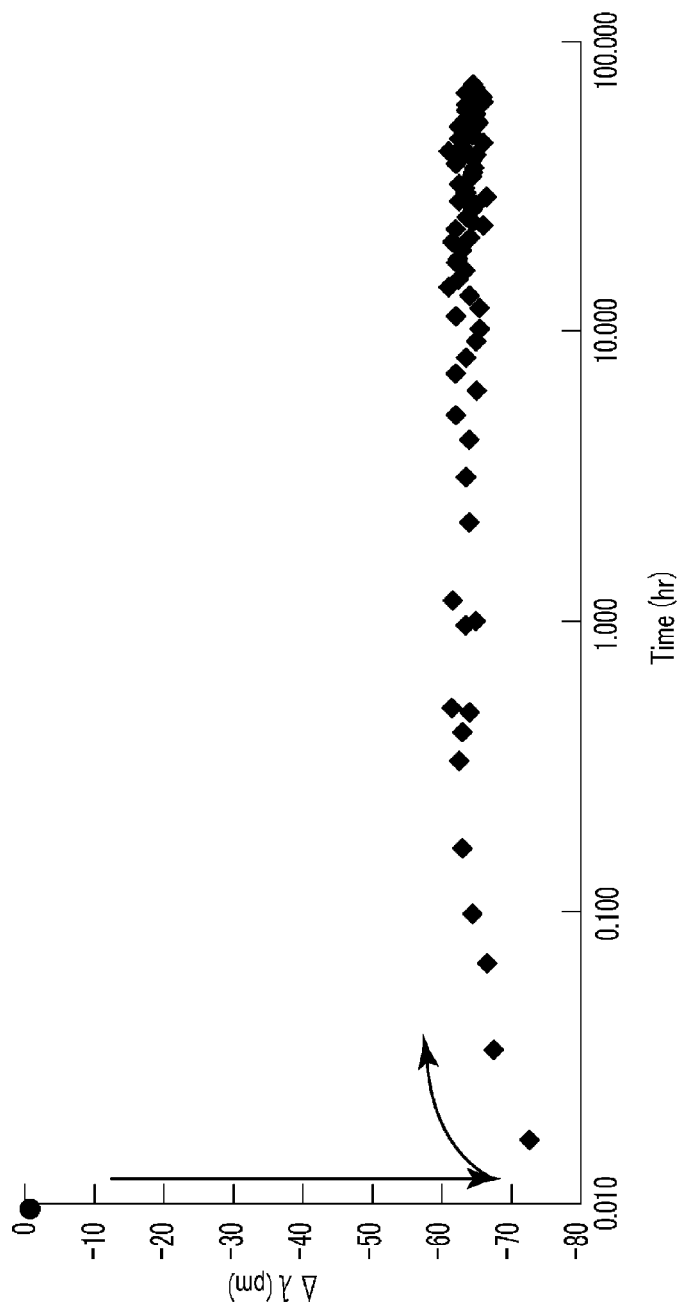
FIG. 4 is a diagram showing the result of filling with a resin obtained by mixing dimethyl silicone KE1056 (refractive index $n_D(25°\ C.)=1.414$) and KLE1055 (refractive index $n_D(25°\ C.)=1.426$) at 1:1.

(refractive index $n_D(25°\ C.)=1.426$) made of Shin-Etsu Silicone have a refractive index difference of 0.012, and FIG. 4 shows the results of changes (instantaneous change and change over time) in wavelength upon input of high power at the time of filling with a resin obtained by mixing the above gels at 1:1. The dimethyl silicone gels KE1056, KLE1055 can be mixed because the refractive index difference therebetween is within 0.04. When a high power of 200 mW is applied, the wavelength shifts to a shorter wave by −75 pm instantaneously (within ten seconds), but thereafter, the wavelength returns to positive by 12 pm in about ten minutes to one hour. In the case of each of the silicone gels KE1056, KE1055, a catalyst and a thermosetting agent are contained in addition to the main silicone. By reducing the amount of the thermosetting agent, each of the silicone gels can be softened to increase the number of unreacted molecules, thereby increasing the backward shift of the refractive index. Adding a plasticizer can also increase the backward shift.

In the present example, the filling resin in the waveguide groove of the optical waveguide circuit has been described, but the filling resin is also applicable between the waveguides and between the fibers.

Example 2

Figure 5:
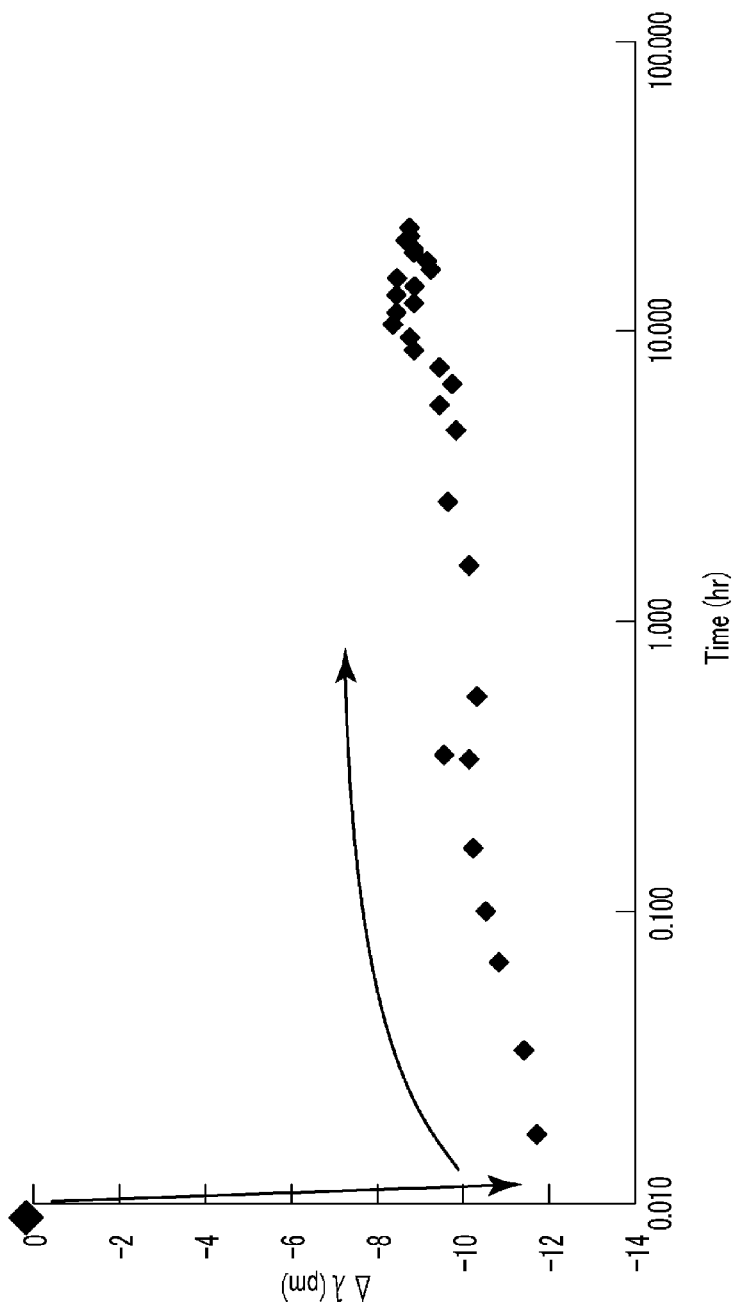
FIG. 5 is a diagram showing the result of filling with fluorine gel X71-8115 manufactured by Shin-Etsu Chemical Co., Ltd.

In the present example, an example will be shown where the following filling resin is applied into the waveguide groove of the optical waveguide circuit. The waveguide groove is filled with fluorine silicone gel X71-8115 (refractive index $n_D(25°\ C.)=1.30$-$1.33$) manufactured by Shin-Etsu Chemical Co., Ltd. FIG. 5 shows the results. The fluorine gel has low absorption (loss of 0.1 dB/cm) at a wavelength of 1550 nm, and therefore, even when high power is input, the temperature rise is small and the instantaneous change is small. On the other hand, in the case of filling with fluorine silicone gel X71-8115, when a high power of 200 mW was input, the wavelength instantaneously shifted by −12 pm.

Thereafter, the wavelength returned to about 8 pm in about ten hours. This means that the wavelength has returned by about 30%.

In the present example, the filling resin in the waveguide groove has been described, but the filling resin used in the present example is also applicable between the waveguides and between the fibers.

Example 3

In the present example, an example will be shown where the following filling resin is applied into the waveguide groove of the optical waveguide circuit. Upon curing of silicone KER 6200 (refractive index $n_D(25°\ C.)=1.500$), 5% of phthalate ester dioctyl phthalate (DOP) was added. Phthalate ester DOP is compatible with silicone and can be mixed uniformly. The refractive index of DOP is 1.485 being lower than that of KER 6200, and when high power is input, this DOP diffuses from the light passing portion to the periphery, so that the refractive index of the portion through which light passes increases. Hence the temperature rises instantaneously upon input of high power and the wavelength shifts to a shorter wave by about −50 pm, but thereafter, the wavelength returns to the original value due to the diffusion of DOP. Many various plasticizers have been developed as shown in Table 1 described above, and it is possible to find therefrom the optimum combination of the silicone material and the plasticizer. Many plasticizers have boiling points close to 400° C., and even when heated, the plasticizers do not volatilize, remain in the silicone as liquid, and can diffuse.

In the present example, the application of the filling resin in the waveguide groove of the optical waveguide circuit has been described, but the filling resin used in the present example is also applicable between the waveguides and between the fibers.

Example 4

Figure 6:
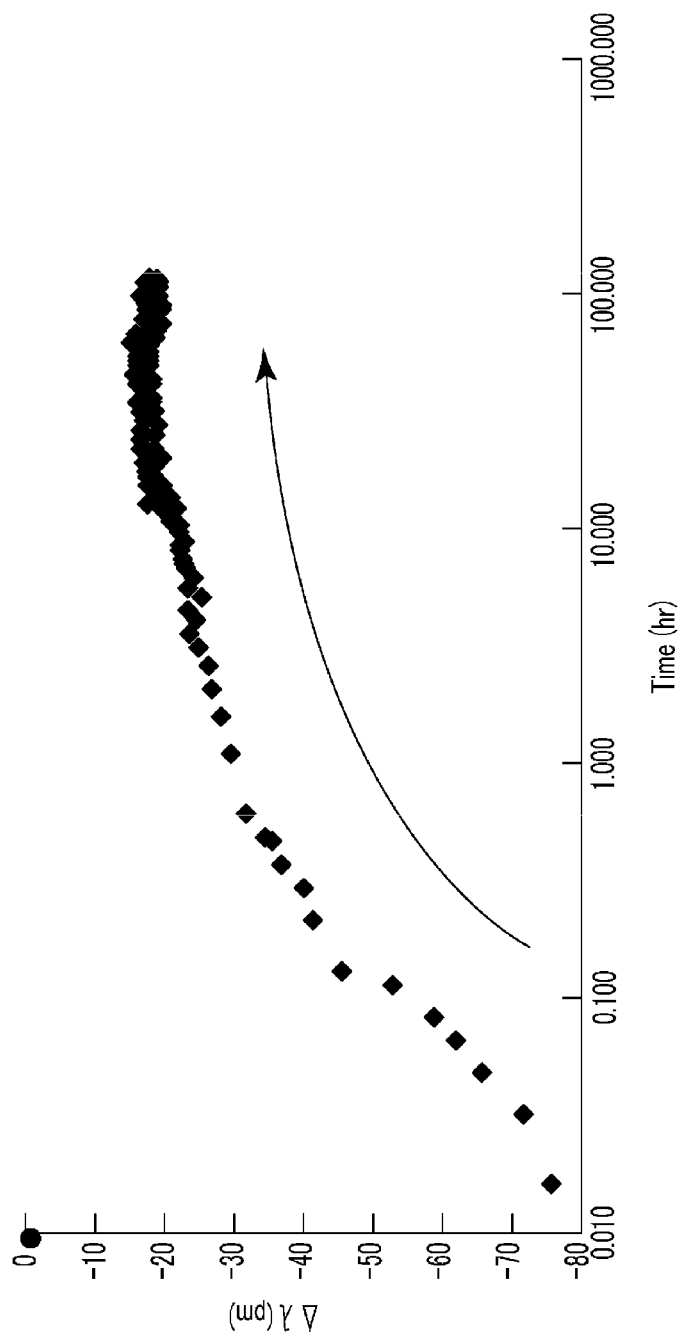
FIG. 6 is a diagram showing a resin obtained by adding a plasticizer to an ethylene-vinyl acetate copolymer.

The ethylene-vinyl acetate copolymer has the temperature dependence (dn/dT) of the refractive index as large as that of silicone and is used as a resin for athermal use. However, the ethylene-vinyl acetate copolymer is relatively hard, and is thus used with a plasticizer added thereto in order to lower the hardness and increase the viscosity. 30% of phthalate ester DOP (refractive index $n_D(25°\ C.)=1.485$) was added to ethylene-vinyl acetate copolymer EVA 450 ($n_D(25°\ C.)=1.4955$), with which the MZI interferometer was filled, and its wavelength was measured. The temperature rose instantaneously and the wavelength shifted to a shorter wave by −75 pm, but DOP diffused in the change over time after the shift, and the wavelength returned almost to its original value. FIG. 6 shows the results. Depending on the relationship between the plasticizer and the refractive index of the base material, upon application of high power, some perform the backward shift and some perform the forward shift. There are a plurality of combinations of these, and all the combinations cannot be described here, but by filling the MZI interferometer shown in FIG. 1 with a resin, its characteristics can be confirmed easily.

Rubbers having large values of dσ/dT and suitable as the athermal resin, except for the ethylene-vinyl acetate copolymer, are polyisobutylene, ethylene-propylene rubber, chlorosulfonated polyethylene rubber, chlorinated polyethylene rubber, polypropylene, polybutadiene rubber, styrene-butadiene block rubber, and styrene polyolefin rubber, and by adding the plasticizer shown in Table 1 up to about 40%, upon input of high power, the change over time in refractive index can be controlled forward and backward, and the instantaneous decrease in refractive index can be compensated.

There were a plurality of combinations of the plasticizer and the rubber, many of which have refractive indices that return, and many of which have refractive indices that do not return and further decrease. In the present invention, all the examples cannot be described, and hence it is taken as a main object of the present invention to find out a phenomenon in which the refractive index decreases and then recovers and to apply that effect to the prevention of the wavelength shift.

In the present example, the filling resin in the waveguide groove of the optical waveguide circuit has been described, but the filling resin is also applicable between the waveguides and between the fibers.

Example 5

In the present example, an example is shown where an optical waveguide circuit in which a forward shifting resin and a backward shifting resin are combined. When high power is applied and a change over time in refractive index is measured, the refractive index changes over several thousands of hours or tens of thousands of hours. Normally, the refractive index shifts to negative. In the case of a device with a refractive index corresponding to a wavelength, that is, in the case of the filter or the like, the change over time in the wavelength of the filter is fatal to the system. The wavelength shift needs to be kept within several pm. Normally, the refractive index of the resin instantaneously shifts to a shorter wave upon application of high power and further shifts gradually to a shorter wave, but the wavelength shift can be made ±0 pm by combining the resin of the present invention in which the refractive index gradually increases upon input of high power.

Figure 7:
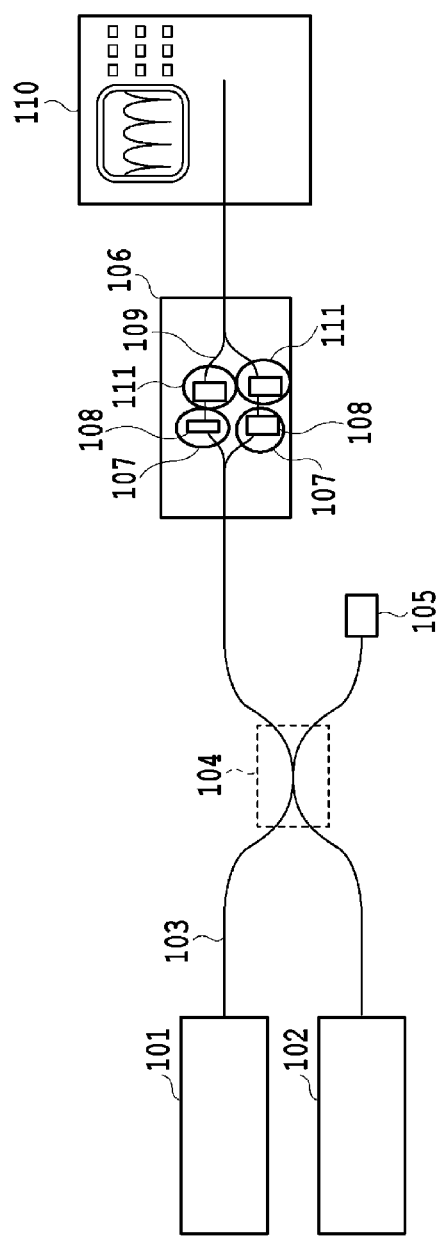
FIG. 7 is a diagram showing a structure of a filter in which a groove in one waveguide is divided into two and filled with two sorts of resins, a forward shifting resin and a backward shifting resin.

FIG. 7 is a diagram showing a structure of a filter in which a groove in one waveguide is divided into two and filled with two sorts of resins, a forward shifting resin and a backward shifting resin. The groove filled with a resin was divided into two, one of which was filled with a material where the wavelength shifts to a shorter wave (shifts forward) in the change over time, and the other of which was filled with a material where the wavelength shifts to a longer wave (shifts backward) in the change over time so that the wavelength did not change at all even over time. Here, the groove 107 dug in the waveguide was filled with the resin 108 where the wavelength shifts to a longer wave (the backward shifting resin, e.g., the resin of Example 1), and a groove 111 was filled with a resin where the wavelength shifts to a shorter wave (e.g., dimethyl silicone). As a result, upon application of optical high power, the wavelength instantaneously shifts to a shorter wave, and thereafter, the wavelength remains constant without gradually changing. FIG. 8 shows the results.

By the normal shift (forward shift) alone, when a high power of 200 mmW is applied, the wavelength gradually shifts to a shorter wave. On the other hand, in the resin of the present invention (the resin having the backward shift), the wavelength shifts to a longer wave. Therefore, when the above two resins are mixed and the grooves shown in FIG. 7 are filled with the two resins, respectively, both resins compensate for each other, and once high power is applied, the wavelength remains constant without the forward or backward shift.

Although the present embodiment has been described taking the athermal MZI as an example, the resin of the present example is also applicable to an athermal arrayed waveguide grating (AWG). It is also important to apply the resin of the present example, in which the refractive index remains unchanged even upon application of high power, into the connection between the waveguide and the fiber and in the connection between the waveguide and the waveguide since a change in refractive index of an adhesive or a filler leads to an increase in loss.

INDUSTRIAL APPLICABILITY

The present invention is applicable to the field of optical communication using optical fibers and waveguides, and the like, or to the field of visible measurement using optical fibers and waveguides.

REFERENCE SIGNS LIST

101 high power light source for 1550 nm
102 1550-nm ASE source
103 fiber
104 coupler
105 terminator
106 optical waveguide circuit
107 groove
108 resin
109 MZI interferometer
110 spectrum analyzer
111 groove

The invention claimed is:

1. A filling resin with which a space between waveguides, a waveguide groove, a space between fibers, or a space between a fiber and a waveguide is filled when a high power of at least 100 mW is transmitted to the fibers and the waveguides, wherein upon input of light, a refractive index of a portion through which the light passes instantaneously decreases, and then the refractive index gradually increases to compensate the initial decrease in the refractive index.

2. The filling resin according to claim 1, wherein the filling resin is dimethyl silicone, phenylmethyl silicone, phenyl silicone, fluorine (F)-containing silicone, or a resin obtained by mixing two or more different sorts of the silicones having a refractive index difference of 0.04 or less.

3. The filling resin according to claim 1, wherein the filling resin is a resin obtained by mixing
  a plasticizer selected from a first group including a phthalic ester plasticizer, an adipic ester plasticizer, and a polyester plasticizer, with
  a resin selected from a second group including dimethyl silicone, phenylmethyl silicone, phenyl silicone, fluorine (F)-containing silicone, a resin obtained by mixing two or more different sorts of silicones having a refractive index difference of 0.04 or less, polyethylene, ethylene-vinyl acetate copolymer, ethylene acrylate copolymer, polyisobutylene, ethylene-propylene rubber, chlorosulfonated polyethylene rubber, chlorinated polyethylene rubber, polypropylene, polybutadiene rubber, styrene-butadiene block rubber, and styrene polyolefin rubber.

4. A filling resin with which the waveguide groove is filled, wherein
  one optical waveguide has two or more places to fill,
  a resin with which some of the places to fill are filled is the filling resin according to claim 2, and
  a resin with which the rest of the places to fill is filled is a resin having a refractive index that gradually decreases after light is input.

5. An optical waveguide circuit having the waveguides, the waveguide groove, or the fibers, wherein the filling resin according to claim 1 is provided between the waveguides, in the waveguide groove, or between the fibers.

6. A filling resin with which the waveguide groove is filled, wherein
  one optical waveguide has two or more places to fill,
  a resin with which some of the places to fill are filled is the filling resin according to claim 3, and
  a resin with which the rest of the places to fill is filled is a resin having a refractive index that gradually decreases after light is input.

7. An optical waveguide circuit having the waveguides, the waveguide groove, or the fibers, wherein the filling resin according to claim 2 is provided between the waveguides, in the waveguide groove, or between the fibers.

8. An optical waveguide circuit having the waveguides, the waveguide groove, or the fibers, wherein the filling resin according to claim 3 is provided between the waveguides, in the waveguide groove, or between the fibers.

9. The filling resin according to claim 2, wherein the silicone gels contain a catalyst and a thermosetting agent.

10. A method for high power operation of an optical fiber and/or waveguide, comprising:
  applying a high power of at least 100 mW input to the fiber and/or waveguide;

wherein a filling resin with which a space between waveguides, a waveguide groove, a space between fibers, or a space between a fiber and a waveguide is filled when the high power of at least 100 mW is transmitted to the fibers and the waveguides, wherein upon input of light, a refractive index of a portion through which the light passes instantaneously decreases, and then the refractive index gradually increases to compensate the initial decrease in the refractive index.

11. The filling resin according to claim 2, wherein the high power input to the fiber and/or waveguide is at least 200 mW.

\* \* \* \* \*